(12) United States Patent
Huang et al.

(10) Patent No.: US 11,197,243 B1
(45) Date of Patent: Dec. 7, 2021

(54) SYSTEMS AND METHODS FOR ACQUIRING NETWORK CONTROL DATA OF A USER EQUIPMENT IN CELLULAR NETWORKS

(71) Applicant: Verizon Patent and Licensing Inc., Basking Ridge, NJ (US)

(72) Inventors: Ye Huang, San Ramon, CA (US); Suzann Hua, Walnut Creek, CA (US); Abhijit Kudrimoti, San Diego, CA (US); Nayyer Kamal Syed, Allen, TX (US); Kevin J. Keigher, Fort Worth, TX (US); Riyaj Uddin Ahmed, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/883,384

(22) Filed: May 26, 2020

(51) Int. Cl.
*H04W 52/02* (2009.01)
*H04W 8/24* (2009.01)
*H04W 8/02* (2009.01)

(52) U.S. Cl.
CPC ......... *H04W 52/0225* (2013.01); *H04W 8/02* (2013.01); *H04W 8/24* (2013.01)

(58) Field of Classification Search
CPC ...... H04W 52/0225; H04W 8/24; H04W 8/02
See application file for complete search history.

(56) References Cited

U.S. PATENT DOCUMENTS

| | | | |
|---|---|---|---|
| 2017/0353928 A1* | 12/2017 | Kim | H04B 1/38 |
| 2019/0069235 A1* | 2/2019 | Patil | H04W 52/0216 |
| 2019/0246374 A1* | 8/2019 | Starsinic | H04W 52/0216 |

\* cited by examiner

*Primary Examiner* — Marisol Figueroa

(57) ABSTRACT

A device of a network may receive, from a network device of the network, data identifying a radio access technology (RAT) type associated with a user equipment of the network, an extended discontinuous reception (eDRX) timer associated with the user equipment, and a power saving mode (PSM) timer associated with the user equipment. The device may store the data identifying the RAT type, the eDRX timer, and the PSM timer, and may provide, to an application server, a notification that includes the data identifying the RAT type, the eDRX timer, and the PSM timer. The data identifying the RAT type, the eDRX timer, and the PSM timer may cause the application server to control or troubleshoot the user equipment.

20 Claims, 7 Drawing Sheets

SYSTEMS AND METHODS FOR ACQUIRING NETWORK CONTROL DATA OF A USER EQUIPMENT IN CELLULAR NETWORKS

BACKGROUND

A network device, such as a service capability exposure function (SCEF), may deliver Internet protocol (IP) data over a user plane in networks, such as a fifth generation (5G) next generation (NG) core network, a fourth generation (4G) core network, and/or the like.

DETAILED DESCRIPTION OF PREFERRED EMBODIMENTS

Figure 1A:
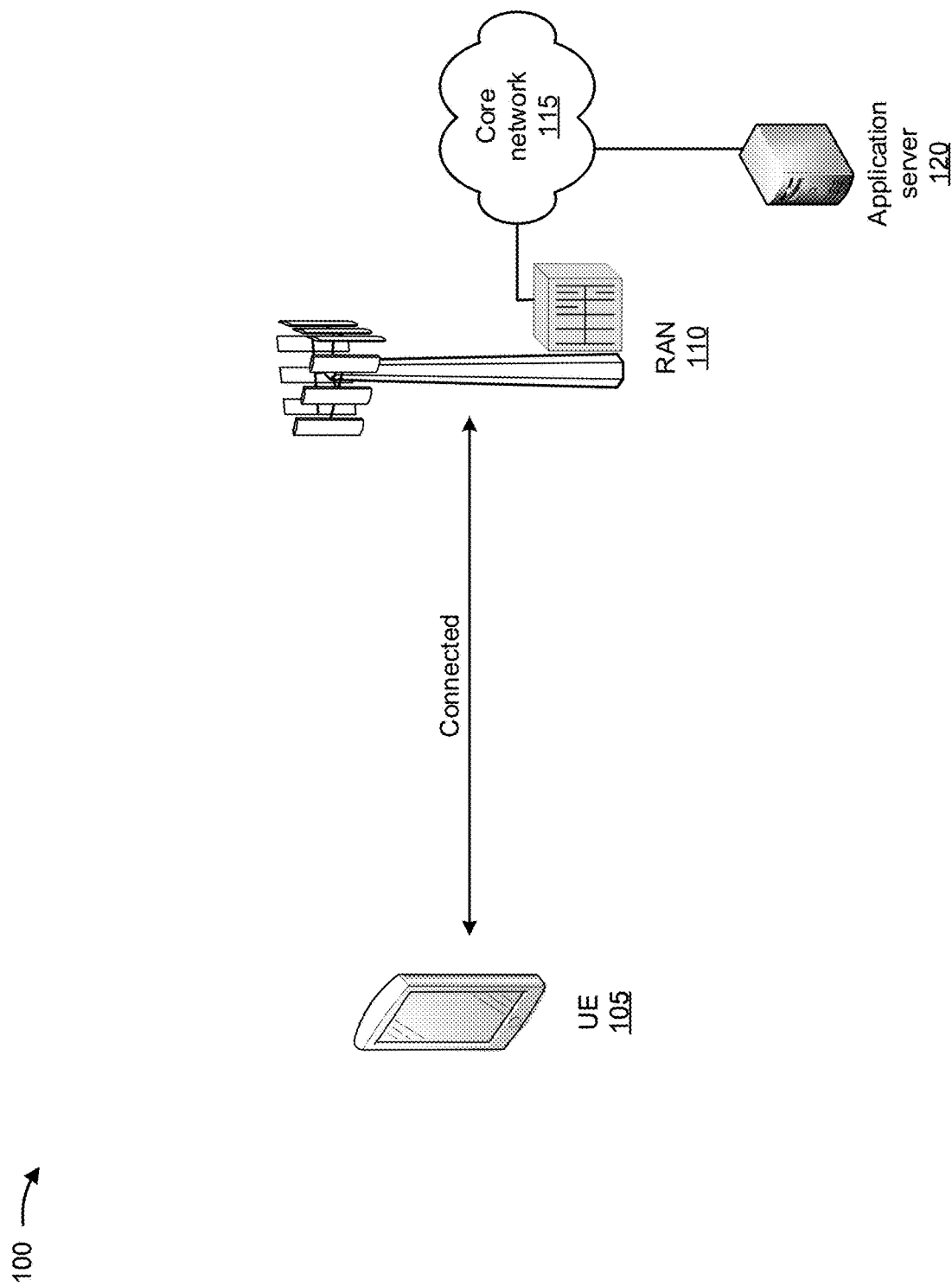
FIGS. 1A-1D are diagrams of one or more example implementations described herein.

The following detailed description of example implementations refers to the accompanying drawings. The same reference numbers in different drawings may identify the same or similar elements.

An application server providing an application (e.g., an Internet of Things (IoT) service, a customer application, and/or the like) to a network may require network control data (e.g., a radio access technology (RAT) type, a power saving mode (PSM) enabled indicator, an extended discontinuous reception (eDRX) enabled indicator, PSM timers, eDRX timers, reachability status, and/or the like) of a user equipment (e.g., an IoT device) for diagnostics, control, and optimization. For example, if an application server is provided network control data identifying current reachability status associated with a user equipment, a last known reachability of the user equipment, disconnect timestamps associated with the user equipment, PSM and eDRX timer values, and/or the like, the application server may determine if the user equipment is operating properly or requires service. With more and more PSM-capable devices and eDRX-capable devices becoming available, lack of access to such network control data will escalate issues for the application server, increase the need for support, and increase carrier operations and support. Currently there is no way to obtain such network control data without performing multiple data source accesses, synthesizing multiple data sources, and/or the like, which increases complexity, results in extended down time and errors and may be resource intensive.

Thereby wasting computing resources (e.g., processing resources, memory resources, communication resources, and/or the like), networking resources, and/or the like associated with performing multiple data source accesses for the network control data, synthesizing multiple data sources for the network control data, handling poor customer experience issues associated with lack of access to the network control data, handling large volumes of traffic, and/or the like.

Some implementations described herein provide a device (e.g., a network device, such as an SCEF) that acquires network control data of a user equipment in cellular networks. For example, the SCEF may receive, from a network device of a network, data identifying a radio access technology (RAT) type associated with a user equipment of the network, an extended discontinuous reception (eDRX) timer associated with the user equipment, and a power saving mode (PSM) timer associated with the user equipment. The SCEF may store the data identifying the RAT type, the eDRX timer, and the PSM timer, and may provide, to an application server, a notification that includes the data identifying the RAT type, the eDRX timer, and the PSM timer. The data identifying the RAT type, the eDRX timer, and the PSM timer may cause the application server to control or troubleshoot the user equipment.

In this way, the SCEF acquires network control data of a user equipment in cellular networks. The network control data may include data identifying current reachability status associated with a user equipment, a last known reachability of the user equipment, disconnect timestamps associated with the user equipment, PSM and eDRX timer values, and/or the like. The network control data may enable the SCEF to determine if the user equipment is operating properly or requires service. Thus, the SCEF conserves computing resources, networking resources, and/or the like that would otherwise have been wasted performing multiple data source accesses for the network control data, synthesizing multiple data sources for the network control data, handling poor customer experience issues associated with lack of access to the network control data, handling large volumes of traffic, and/or the like.

FIGS. 1A-1D are diagrams of one or more example implementations 100 described herein. As shown in FIG. 1A, a user equipment 105 (e.g., an IoT device) may be connected to a radio access network (RAN) 110 associated with a core network 115 and an application server 120. RAN 110 may include one or more radio transmitters. Core network 115 may include an example architecture of a 4G core network or a 5G NG core network included in a 5G wireless telecommunications system, and may include physical elements, virtual elements, or a combination of physical and virtual elements. Application server 120 may include an application server device that provides application data (e.g., associated with an application, such as an Internet of Things (IoT) application) to user equipment 105 and/or receives data from user equipment 105. Although implementations are described herein in connection with a 4G core network, the implementations may be utilized with other types of core networks, such as a 5G NG core network.

Figure 1B:
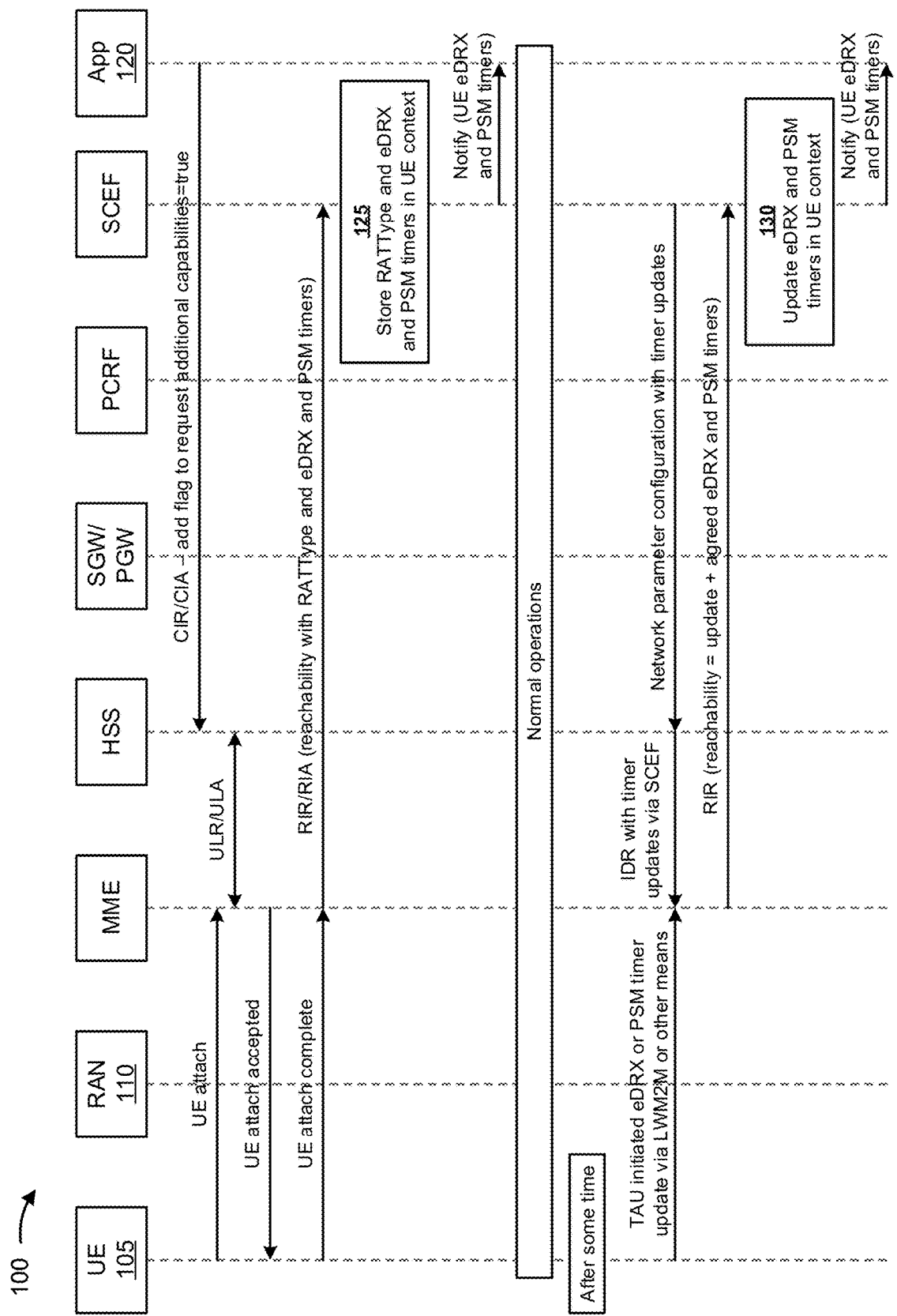

FIG. 1B is a diagram of a control flow associated with acquiring network control data from user equipment 105 in a cellular network (e.g., RAN 110) for application server 120 using a reachability event report. The control flow may include a process performed by one or more network devices of core network 115, such as a SCEF and a mobility management entity device (MME) associated with attribute value pairs (AVPs) that include network control data. The AVPs may identify a radio access technology (RAT) type associated with user equipment 105, an eDRX timer associated with user equipment 105, a PSM timer associated with user equipment 105, and/or the like.

As further shown in FIG. 1B, application server 120 may send (e.g., via a configuration information request (CIR) and a configuration information answer (CIA) exchange), from a home subscriber server (HSS) of core network 115, a request for additional capabilities. The MME may receive, from user equipment 105, a user equipment (UE) attach request. The MME may engage in an update location request and an update location answer (ULR/ULA) exchange with the HSS, and may provide a UE attach accepted message to user equipment 105. The MME may receive a UE attach complete message from user equipment 105 based on providing the UE attach accepted message to user equipment 105.

As further shown in FIG. 1B, the MME may engage in a reporting information request and a reporting information answer (RIR/RIA) exchange with the SCEF. For example, the SCEF may provide an RIR to the MME, and may receive an RIA from the MME in response to the RIR. The RIA may include an indication of reachability of user equipment 105 and data identifying a RAT type, an eDRX timer, and a PSM timer associated with user equipment 105. The indication of reachability may include data identifying a current reachability status of user equipment 105, a last reachable date and time associated with user equipment 105, a last disconnect date and time associated with user equipment 105, a last data transmission date and time associated with user equipment 105, an active time duration associated with user equipment 105, a PSM time duration associated with user equipment 105, and/or the like. The RAT type may include a long term evolution (LTE) type, an LTE-machine type communication (LTE-M) type, a narrow band Internet of Things (NB-IoT) type, and/or the like. The eDRX timer may be associated with an active time or an idle cycle time of user equipment 105. The PSM timer may be associated with the active time or a tracking area update (TAU) sleep time of user equipment 105.

As further shown in FIG. 1B, and by reference number 125, the SCEF may store the indication of reachability and the data identifying the RAT type, the eDRX timer, and the PSM timer (e.g., in a user equipment context). The SCEF may provide, to application server 120, a notification that includes the data identifying the RAT type, the eDRX timer, and the PSM timer. The data identifying the RAT type, the eDRX timer, and the PSM timer may enable application server 120 to control and/or troubleshoot user equipment 105. User equipment 105, RAN 110, the MME, the HSS, the SCEF, and application server 120 may then engage in normal operations for a period of time. After the period of time, the MME may receive, from user equipment 105, a message indicating a TAU initiated eDRX timer update and/or a PSM timer update. For example, the eDRX timer update and/or the PSM timer update may be indicated via a lightweight machine-to-machine (LWM2M) protocol or another protocol. Alternatively, the SCEF may provide, to the HSS, a network parameter configuration change that includes the eDRX timer update and/or the PSM timer update. The HSS may provide, to the MME, an insert subscriber data request (IDR) that includes data identifying the eDRX timer update and/or the PSM timer update.

As further shown in FIG. 1B, the SCEF may receive data identifying the updated eDRX timer and the updated PSM timer associated with user equipment 105. For example, the MME may provide, to the SCEF, an RIR indicating that a reachability of user equipment 105 has been updated, and that the eDRX timer and the PSM timer have been updated. Based on receiving the data identifying the updated eDRX timer and the updated PSM timer, the SCEF may replace the data identifying the eDRX timer and the PSM timer with the data identifying the updated eDRX timer and the updated PSM timer. For example, as shown by reference number 130 in FIG. 1B, the SCEF may update the eDRX timer and the PSM timer (e.g., in a user equipment context). Alternatively, when the eDRX timer update and/or the PSM timer update are generated by the SCEF, the SCEF may have already updated the eDRX timer and the PSM timer and need not replace the data identifying the eDRX timer and the PSM timer with the data identifying the updated eDRX timer and the updated PSM timer.

As further shown in FIG. 1B, the SCEF may provide, to application server 120, a notification that includes the data identifying the updated eDRX timer and the updated PSM timer. The data identifying the updated eDRX timer and the updated PSM timer may enable application server 120 to update a control and/or a troubleshooting of user equipment 105. For example, the data identifying the updated eDRX timer and the updated PSM timer may enable application server 120 to determine whether user equipment 105 is operating properly, requires service, is available to receive data, is available to transmit data, and/or the like. In this way, control of user equipment 105 may be improved, provision of trouble-shooting information associated with user equipment 105 may be improved (e.g., based on intelligent applications, such as trackers, electric/gas meters, smart city sensors, and/or the like), and/or the like.

Figure 1C:
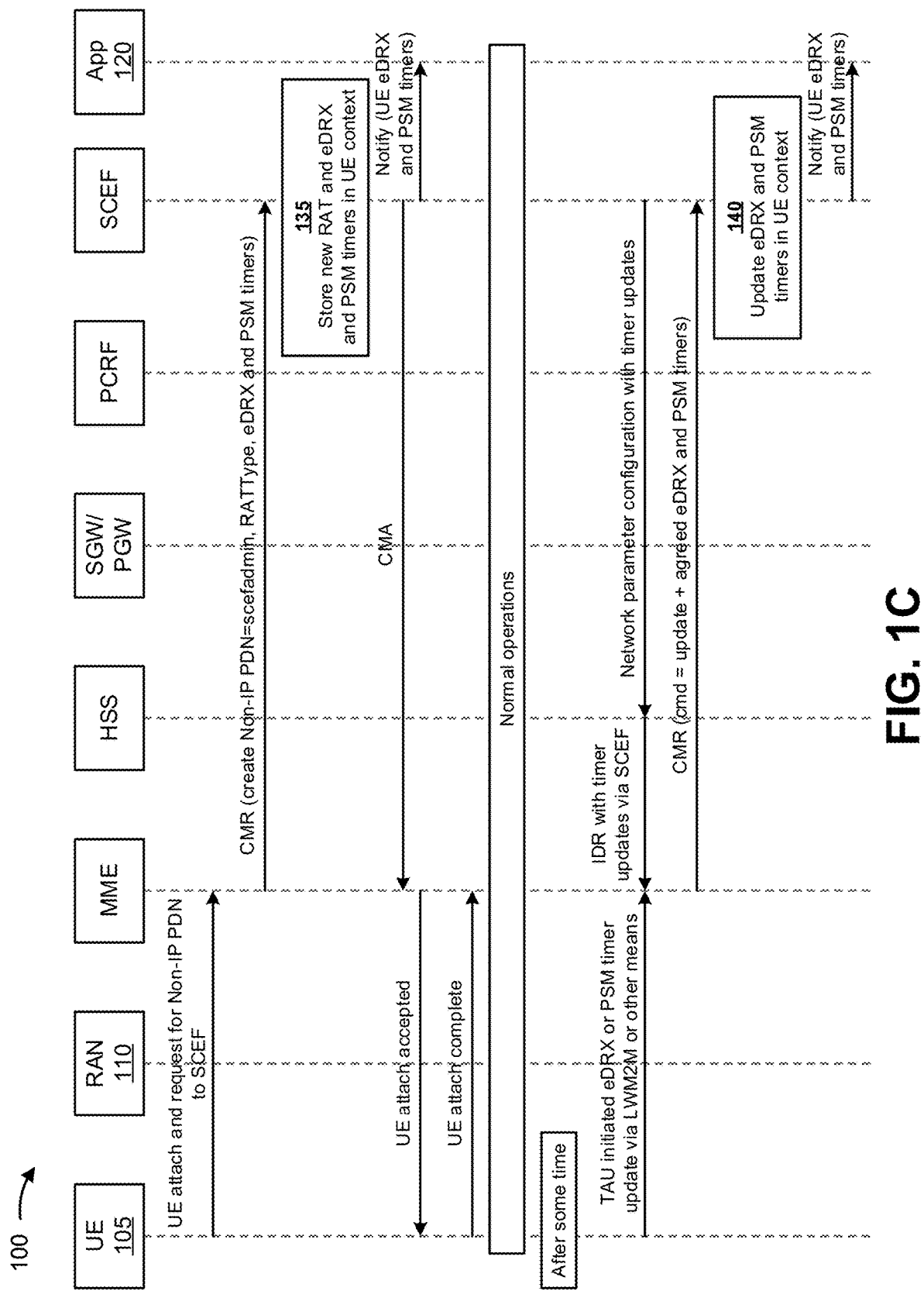

FIG. 1C is a diagram of a control flow associated with acquiring network control data from user equipment 105 in a cellular network (e.g., RAN 110) for application server 120 using a connection management request. The control flow may include a process performed by one or more network devices of core network 115, such as a SCEF and an MME associated with AVPs that include network control data. The AVPs may identify a RAT type associated with user equipment 105, an eDRX timer associated with user equipment 105, a PSM timer associated with user equipment 105, and/or the like.

As further shown in FIG. 1C, the MME may receive, from user equipment 105, a UE attach request and a request for a non-Internet protocol (IP) packet data network (PDN) to SCEF communication. Based on the request for the non-IP PDN, the MME may provide, to the SCEF, a connection management request (CMR) that includes a request for the SCEF to create a non-IP PDN session associated with user equipment 105 and data identifying a RAT type, an eDRX timer, and a PSM timer associated with user equipment 105.

As further shown in FIG. 1C, and by reference number 135, the SCEF may store the data identifying the RAT type, the eDRX timer, and the PSM timer associated with user equipment 105 (e.g., in a user equipment context). The SCEF may provide, to application server 120, a notification that includes the data identifying the RAT type, the eDRX timer, and the PSM timer associated with user equipment 105. The data identifying the RAT type, the eDRX timer, and the PSM timer may enable application server 120 to control and/or troubleshoot user equipment 105. Additionally, the SCEF may provide, to the MME, a connection management answer (CMA) that includes data indicating that the SCEF created the non-IP PDN session for user equipment 105 based on the RAT type, the eDRX timer, and the PSM timer associated with user equipment 105. The MME may provide a UE attach accepted message to user equipment 105, and the MME may receive a UE attach complete message from user equipment 105.

User equipment 105, RAN 110, the MME, the HSS, the SCEF, and application server 120 may then engage in normal operations for a period of time. After the period of time, the MME may receive, from user equipment 105, a message indicating a TAU initiated eDRX timer update and/or a PSM timer update. For example, the eDRX timer update and/or the PSM timer update may be indicated via a LWM2M protocol or another protocol. Alternatively, the SCEF may provide, to the HSS, a network parameter configuration change that includes the eDRX timer update and/or the PSM timer update. The HSS may provide, to the MME, an IDR that includes data identifying the eDRX timer update and/or the PSM timer update.

As further shown in FIG. 1C, the SCEF may receive data identifying the updated eDRX timer and the updated PSM timer associated with user equipment 105. For example, the MME may provide, to the SCEF, a CMR indicating that a reachability of user equipment 105 has been updated, and that the eDRX timer and the PSM timer have been updated. Based on receiving the data identifying the updated eDRX timer and the updated PSM timer, the SCEF may replace the data identifying the eDRX timer and the PSM timer with the data identifying the updated eDRX timer and the updated PSM timer. For example, as shown by reference number 140 in FIG. 1C, the SCEF may update the eDRX timer and the PSM timer (e.g., in a user equipment context). Alternatively, when the eDRX timer update and/or the PSM timer update are generated by the SCEF, the SCEF may have already updated the eDRX timer and the PSM timer and need not replace the data identifying the eDRX timer and the PSM timer with the data identifying the updated eDRX timer and the updated PSM timer.

As further shown in FIG. 1C, the SCEF may provide, to application server 120, a notification that includes the data identifying the updated eDRX timer and the updated PSM timer. The data identifying the updated eDRX timer and the updated PSM timer may enable application server 120 to update a control and/or a troubleshooting of user equipment 105. In this way, control of user equipment 105 may be improved, provision of trouble-shooting information associated with user equipment 105 may be improved (e.g., based on intelligent applications, such as trackers, electric/gas meters, smart city sensors, and/or the like), and/or the like. Furthermore, the network control data and updated data may be utilized by the SCEF and/or application server 120 to create improved data delivery services (e.g., retry services, RAT switching services, and/or the like).

Figure 1D:
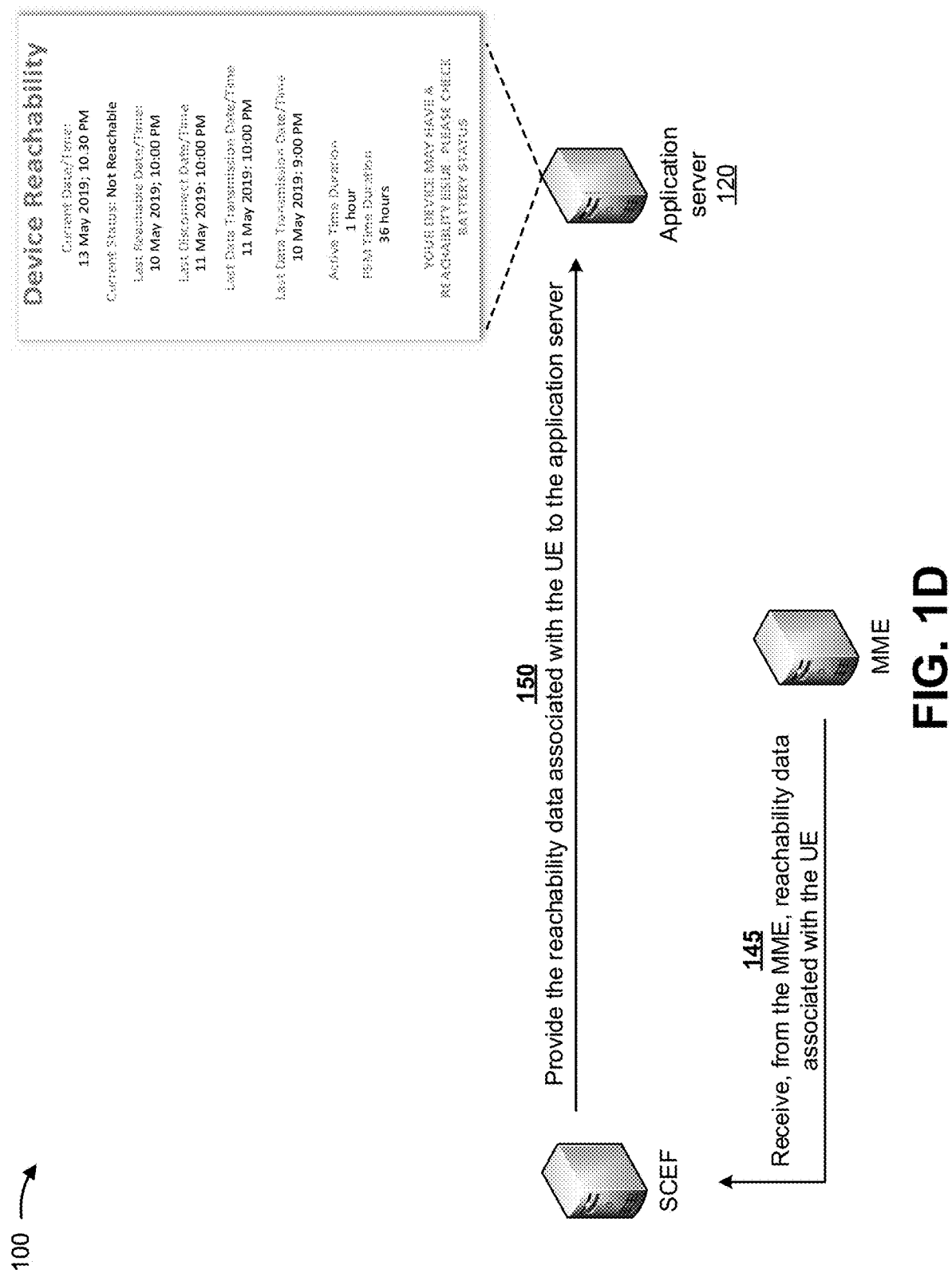

As shown in FIG. 1D, and by reference number 145, the SCEF may receive, from the MME, reachability data associated with user equipment 105. For example, the reachability data may include data identifying a current reachability status of user equipment 105, a last reachable date and time associated with user equipment 105, a last disconnect date and time associated with user equipment 105, a last data transmission date and time associated with user equipment 105, an active time duration associated with user equipment 105, a PSM time duration associated with user equipment 105, and/or the like.

As further shown in FIG. 1D, and by reference number 150, the SCEF may provide the reachability data associated with user equipment 105 to application server 120. When providing the reachability data, the SCEF may provide, to application server 120, a user interface that includes the reachability data identifying the reachability associated with user equipment 105. The user interface may include additional information than depicted in FIG. 1D, such as a current date and time, a notification that user equipment 105 may have a reachability issue, a battery level associated with user equipment 105, and/or the like.

As noted above, although implementations are described herein in connection with a 4G core network, the implementations may be utilized with other types of core networks, such as a 5G NG core network. In this case, functions described above as being performed by the MME may be performed by an access and mobility management function device (AMF), functions described above as being performed by the HSS may be performed by a unified data management device (UDM), and functions described above as being performed by the SCEF may be performed by a network exposure function device (NEF).

In this way, the SCEF of core network 115 acquires network control data of user equipment 105 in cellular networks, such as RAN 110 and core network 115. This enables the SCEF to determine if user equipment 105 is operating properly or requires service, manage user equipment 105, manage subscriptions associated with the SCEF, provide a data structure for storing the network control data, provide a PDN connectivity status, provide idle status information associated user equipment 105, and/or the like. Thus, the SCEF conserves computing resources, networking resources, and/or the like that would otherwise have been wasted performing multiple data source accesses for the network control data, synthesizing multiple data sources for the network control data, handling poor customer experience issues associated with lack of access to the network control data, handling large volumes of traffic, and/or the like.

As indicated above, FIGS. 1A-1D are provided merely as examples. Other examples may differ from what was described with regard to FIGS. 1A-1D. The number and arrangement of devices and networks shown in FIGS. 1A-1D are provided as an example. In practice, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) of FIGS. 1A-1D may perform one or more functions described as being performed by another set of devices of FIGS. 1A-1D.

Figure 2:
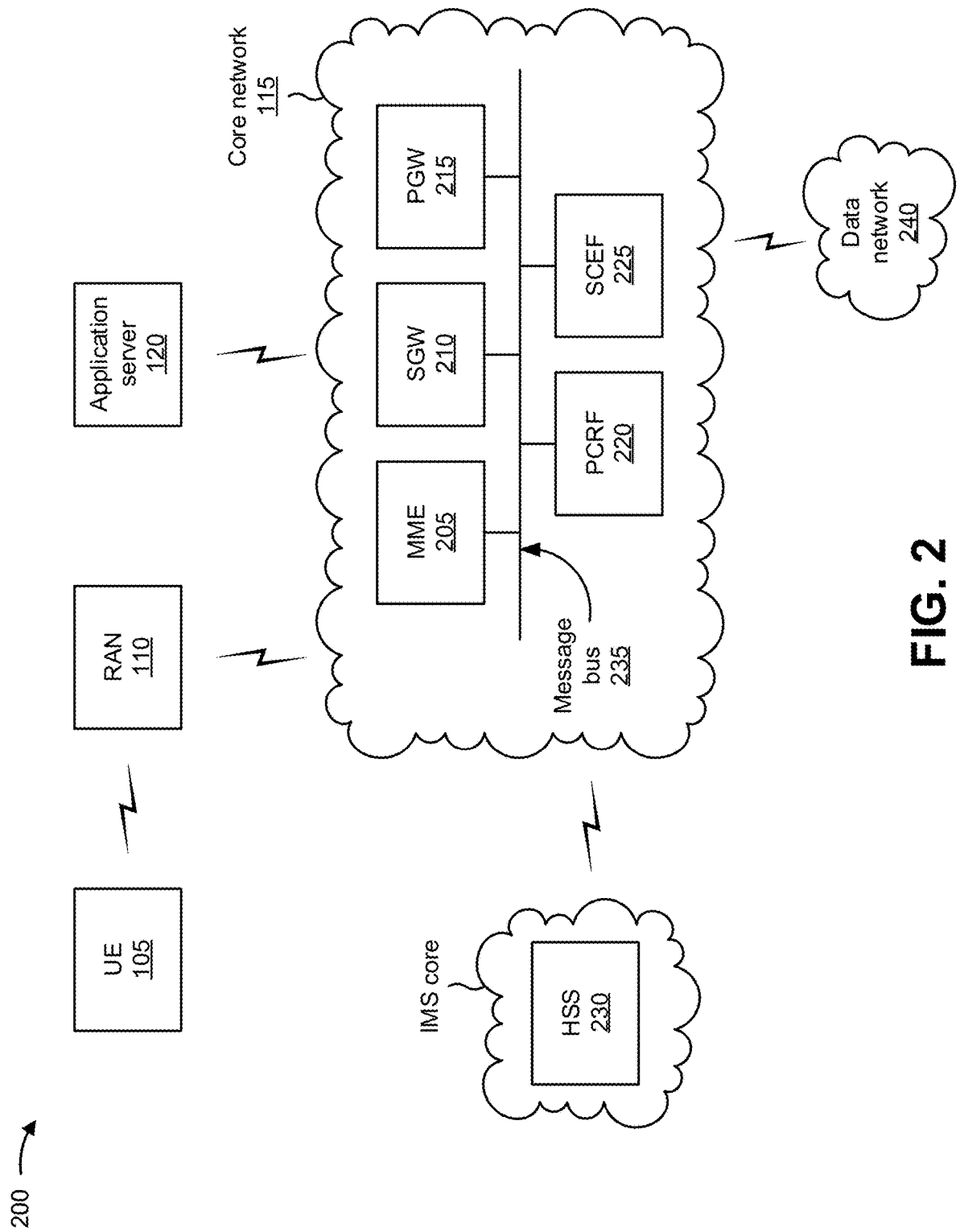
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include user equipment 105, RAN 110, core network 115, application server 120, and a data network 240. Devices and/or networks of example environment 200 may interconnect via wired connections, wireless connections, or a combination of wired and wireless connections.

User equipment 105 includes one or more devices capable of receiving, generating, storing, processing, and/or providing information, such as information described herein. For example, user equipment 105 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, and/or the like), a mobile hotspot device, a fixed wireless access device, customer premises equipment, an autonomous vehicle, or a similar type of device.

RAN 110 may support, for example, a cellular radio access technology (RAT). RAN 110 may include base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that may support wireless communication for user equipment 105. RAN 110 may transfer traffic between user equipment 105 (e.g., using a cellular RAT), base stations (e.g., using a wireless interface or a backhaul interface, such as a wired backhaul interface), and/or core network 115. RAN 110 may provide one or more cells that cover geographic areas.

RAN 110 may perform scheduling and/or resource management for user equipment 105 covered by RAN 110 (e.g., user equipment 105 covered by a cell provided by RAN 110). In some implementations, RAN 110 may be controlled or coordinated by a network controller, which may perform load balancing, network-level configuration, and/or the like. The network controller may communicate with RAN 110 via a wireless or wireline backhaul. In some implementations, RAN 110 may include a network controller, a self-organizing network (SON) module or component, or a similar module or component. In other words, RAN 110 may perform network control, scheduling, and/or network management functions (e.g., for uplink, downlink, and/or sidelink communications of user equipment 105 covered by RAN 110).

Core network 115 may include an evolved packet core (EPC) network that operates based on a third generation partnership project (3GPP) wireless communication standard. As shown in FIG. 2, core network 115 may include a mobility management entity device (MME) 205, a serving gateway (SGW) 210, a packet data network gateway (PGW) 215, a policy and charging rules function (PCRF) 220, and an SCEF 225 that enable user equipment 105 to communicate with application server 120, data network 240, and/or an Internet protocol (IP) multimedia subsystem (IMS) core. Elements of core network 115 may interconnect via a message bus 235, as further shown in FIG. 2. The IMS core may include a home subscriber server (HSS) 230, and may manage device registration and authentication, session initiation, and/or the like, associated with user equipment 105. HSS 230 may reside in core network 115 and/or the IMS core.

MME 205 includes one or more devices, such as one or more server devices, capable of managing authentication, activation, deactivation, and/or mobility functions associated with user equipment 105. MME 205 may perform operations relating to authentication of user equipment 105. Additionally, or alternatively, MME 205 may facilitate the selection of a particular SGW 210 and/or a particular PGW 215 to serve traffic to and/or from user equipment 105. MME 205 may perform operations associated with handing off user equipment 105 from a first RAN 110 to a second RAN 110 when user equipment 105 is transitioning from a first cell associated with the first RAN 110 to a second cell associated with the second RAN 110. Additionally, or alternatively, MME 205 may select another MME (not pictured), to which user equipment 105 should be handed off (e.g., when user equipment 105 moves out of range of MME 205).

SGW 210 includes one or more devices capable of routing packets. For example, SGW 210 may include one or more data processing and/or traffic transfer devices, such as a gateway, a router, a modem, a switch, a firewall, a network interface card (MC), a hub, a bridge, a server device, an optical add/drop multiplexer (OADM), or any other type of device that processes and/or transfers traffic. SGW 210 may aggregate traffic received from one or more RANs 110, and may send the aggregated traffic to data network 240 (e.g., via PGW 215) and/or other network devices associated with core network 115 and/or the IMS core. SGW 210 may also receive traffic from data network 240 and/or other network devices, and may send the received traffic to user equipment 105 via RAN 110. Additionally, or alternatively, SGW 210 may perform operations associated with handing off user equipment 105 to and/or from an LTE network.

PGW 215 includes one or more devices capable of providing connectivity for user equipment 105 to external packet data networks (e.g., other than the depicted core network 115). For example, PGW 215 may include one or more data processing and/or traffic transfer devices, such as a gateway, a router, a modem, a switch, a firewall, a MC, a hub, a bridge, a server device, an OADM, or any other type of device that processes and/or transfers traffic. PGW 215 may aggregate traffic received from one or more SGWs 210, and may send the aggregated traffic to data network 240. Additionally, or alternatively, PGW 215 may receive traffic from data network 240, and may send the traffic to user equipment 105 via SGW 210 and RAN 110. PGW 215 may record data usage information (e.g., byte usage).

PCRF 220 includes one or more devices, such as one or more server devices, capable of providing policy control decision and flow-based charging control functionalities. For example, PCRF 220 may provide network control regarding service data flow detection, gating, quality of service (QoS) and flow-based charging, and/or the like. PCRF 220 may determine how a certain service data flow is to be treated, and may ensure that user plane traffic mapping and treatment is in accordance with a user subscription profile.

SCEF 225 includes one or more devices that receive, store, generate, determine, provide, and/or the like information associated with a group messaging service. For example, SCEF 225 may include a server device or a group of server devices. SCEF 225 may perform one or more actions performed by a network exposure function (NEF) and/or a network repository function (NRF).

HSS 230 includes one or more devices, such as one or more server devices, capable of managing (e.g., receiving, generating, storing, processing, providing, and/or the like) information associated with user equipment 105. For example, HSS 230 may manage subscription information associated with user equipment 105, such as information associated with a subscriber profile of a user associated with user equipment 105, information associated with services and/or applications that are accessible to user equipment 105, location information associated with user equipment 105, a network identifier (e.g., a network address) associated with user equipment 105, information associated with a treatment of user equipment 105 (e.g., quality of service information, a quantity of minutes allowed per time period, a quantity of data consumption allowed per time period, and/or the like), and/or the like. HSS 230 may provide this information to one or more other devices of environment 200 to support the operations performed by those devices.

Message bus 235 represents a communication structure for communication among the elements of core network 115. In other words, message bus 235 may permit communication between two or more elements of core network 115.

Although core network 115 is shown as a fourth generation (4G) architecture, core network 115 may include other architectures in which systems and/or methods described herein may be implemented. For example, core network 115 may include an example architecture of a fifth generation (5G) next generation (NG) core network included in a 5G wireless telecommunications system.

Application server 120 includes one or more devices capable of receiving, generating, storing, processing, and/or providing information, such as information described herein. For example, application server 120 may include a laptop computer, a tablet computer, a desktop computer, a group of server devices, or a similar type of device. Application server 120 may receive information from and/or transmit information to user equipment 105 and/or core network 115.

Data network 240 includes one or more wired and/or wireless data networks. For example, data network 240 may include an IMS, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
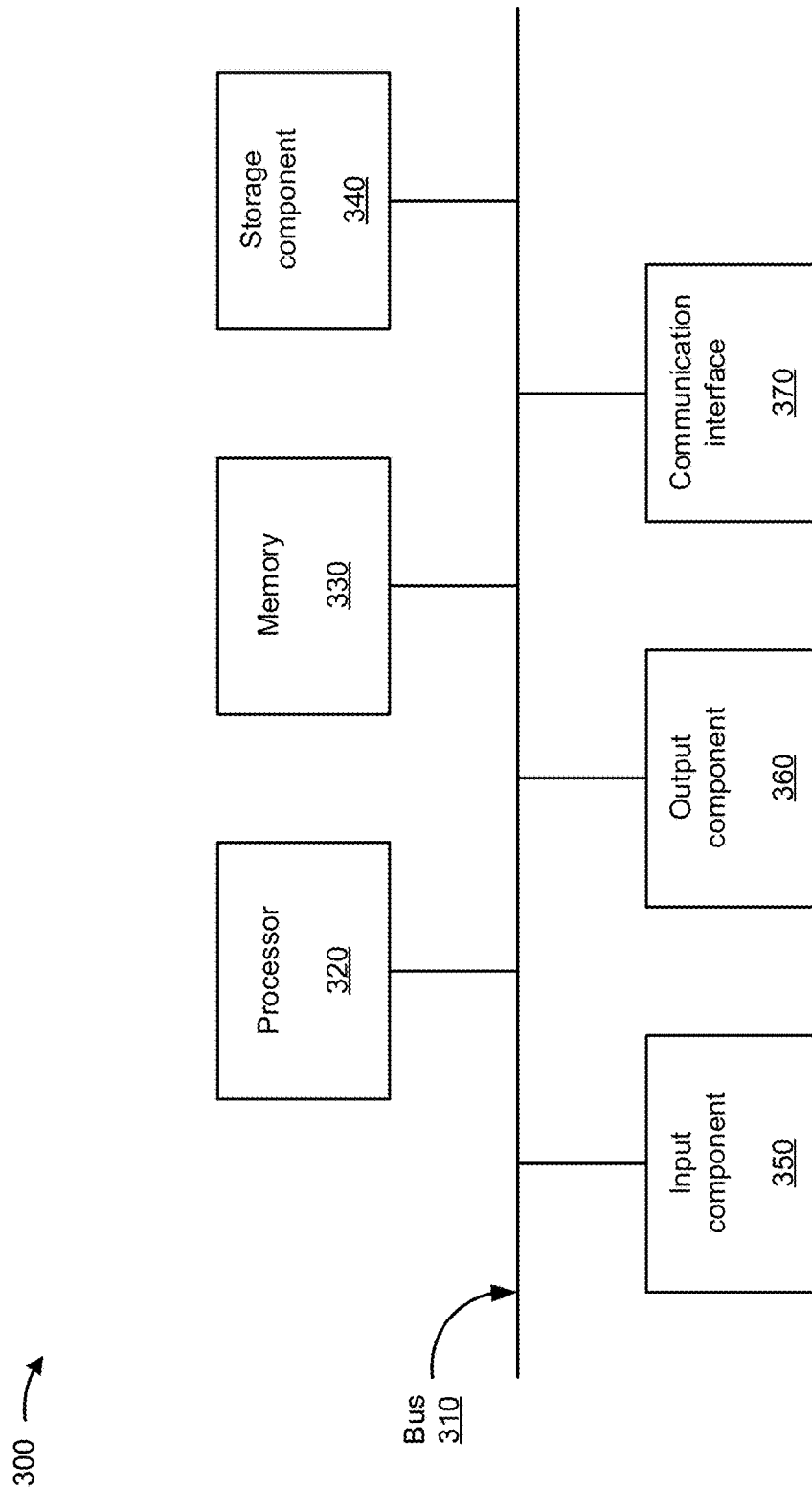
FIG. 3 is a diagram of example components of one or more devices of FIG. 2.

FIG. 3 is a diagram of example components of a device 300. Device 300 may correspond to user equipment 105, application server 120, MME 205, SGW 210, PGW 215, PCRF 220, SCEF 225, and/or HSS 230. In some implementations, user equipment 105, application server 120, MME 205, SGW 210, PGW 215, PCRF 220, SCEF 225, and/or HSS 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
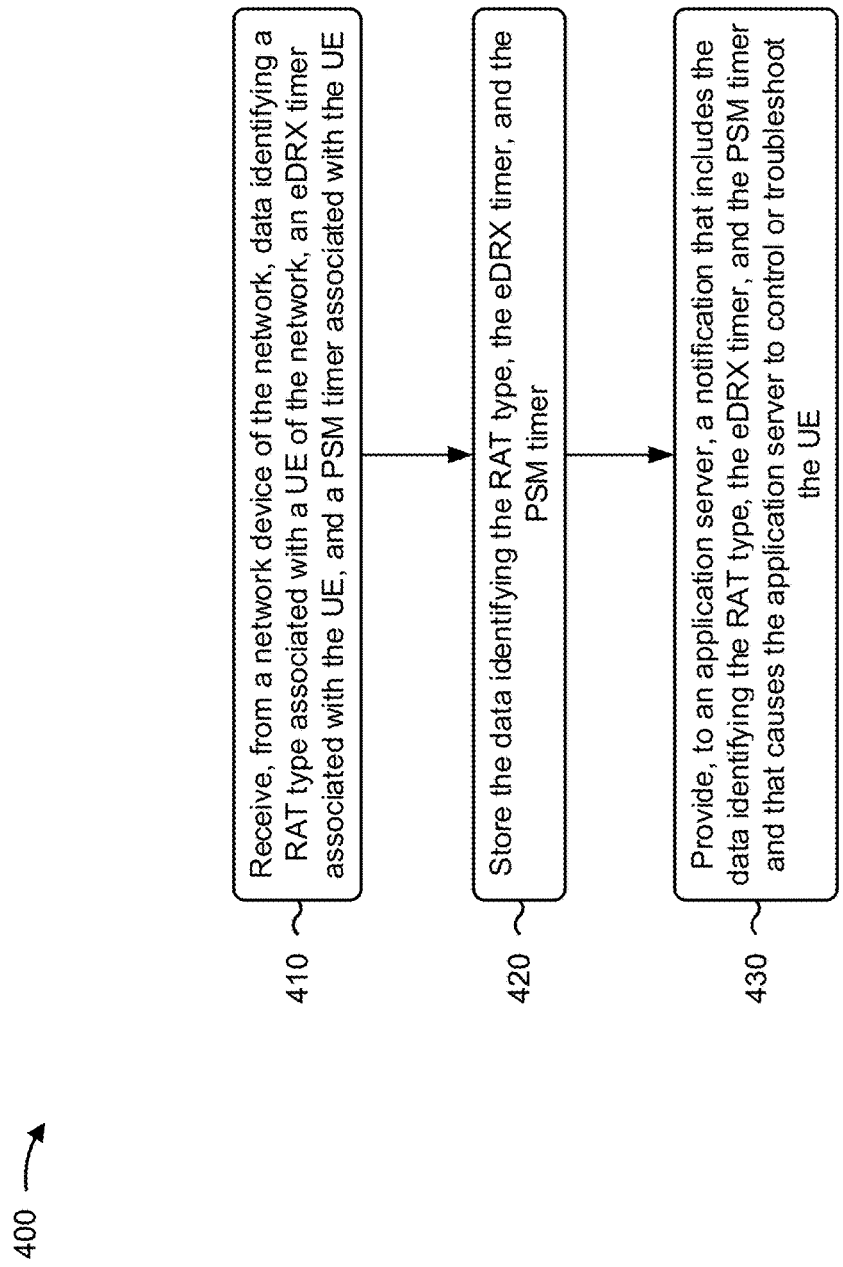
FIG. 4 is a flow chart of an example process for acquiring network control data of a user equipment in cellular networks.

FIG. 4 is a flow chart of an example process 400 for acquiring network control data of a user equipment in cellular networks. In some implementations, one or more process blocks of FIG. 4 may be performed by a device (e.g., SCEF 225). In some implementations, one or more process blocks of FIG. 4 may be performed by another device or a group of devices separate from or including the device, such as a user equipment (e.g., user equipment 105), an application server (e.g., application server 120), and/or an MME (e.g., MME 205).

As shown in FIG. 4, process 400 may include receiving, from a network device of the network, data identifying a radio access technology (RAT) type associated with a user equipment of the network, an extended discontinuous reception (eDRX) timer associated with the user equipment, and a power saving mode (PSM) timer associated with the user equipment (block 410). For example, the device (e.g., using processor 320, memory 330, communication interface 370, and/or the like) may receive, from a network device of the network, data identifying a RAT type associated with a user equipment of the network, an eDRX timer associated with the user equipment, and a PSM timer associated with the user equipment, as described above. In some implementations, the eDRX timer is associated with an active time or an idle cycle time of the user equipment and the PSM timer is associated with the active time or a tracking area update sleep time of the user equipment. In some implementations, the device includes a service capability exposure function and the network device includes a mobility management entity. In some implementations, the user equipment includes an Internet of Things device.

As further shown in FIG. 4, process 400 may include storing the data identifying the RAT type, the eDRX timer, and the PSM timer (block 420). For example, the device (e.g., using processor 320, storage component 340, and/or the like) may store the data identifying the RAT type, the eDRX timer, and the PSM timer, as described above.

As further shown in FIG. 4, process 400 may include providing, to an application server, a notification that includes the data identifying the RAT type, the eDRX timer, and the PSM timer, wherein the data identifying the RAT type, the eDRX timer, and the PSM timer is to cause the application server to control or troubleshoot the user equipment (block 430). For example, the device (e.g., using processor 320, memory 330, storage component 340, communication interface 370, and/or the like) may provide, to an application server, a notification that includes the data identifying the RAT type, the eDRX timer, and the PSM timer, as described above. In some implementations, the data identifying the RAT type, the eDRX timer, and the PSM timer may cause the application server to control or troubleshoot the user equipment.

Process 400 may include additional implementations, such as any single implementation or any combination of implementations described below and/or in connection with one or more other processes described elsewhere herein.

In some implementations, process 400 includes providing a report information request to the network device, and receiving the data identifying the RAT type, the eDRX timer, and the PSM timer includes receiving the data identifying the RAT type, the eDRX timer, and the PSM timer via a report information answer received in response to the report information request.

In some implementations, receiving the data identifying the RAT type, the eDRX timer, and the PSM timer includes receiving the data identifying the RAT type, the eDRX timer, and the PSM timer via a connection management request from the network device.

In some implementations, process 400 includes receiving updated data identifying an updated eDRX timer associated with the user equipment, and an updated PSM timer associated with the user equipment; replacing the data identifying the eDRX timer and the PSM timer with the updated data identifying the updated eDRX timer and the updated PSM timer; and providing, to the application server, another notification that includes the updated data identifying the updated eDRX timer and the updated PSM timer, wherein the updated data identifying the updated eDRX timer and the updated PSM timer is to cause the application server to update control or troubleshooting of the user equipment.

In some implementations, process 400 includes providing a report information request to the network device, and receiving the updated data identifying the updated eDRX timer and the updated PSM timer includes receiving the updated data identifying the updated eDRX timer and the updated PSM timer via report information answer received in response to the report information request.

In some implementations, receiving the updated data identifying the updated eDRX timer and the updated PSM timer includes receiving the updated data identifying the updated eDRX timer and the updated PSM timer via a connection management request.

In some implementations, process 400 includes determining updated data identifying an updated eDRX timer associated with the user equipment and an updated PSM timer associated with the user equipment; replacing the data identifying the eDRX timer and the PSM timer with the updated data identifying the updated eDRX timer and the updated PSM timer; and providing, to the application server, another notification that includes the updated data identifying the updated eDRX timer and the updated PSM timer, wherein the updated data identifying the updated eDRX timer and the updated PSM timer is to cause the application server to update control or troubleshooting of the user equipment.

In some implementations, process 400 includes causing the updated data identifying the updated eDRX timer and the updated PSM timer to be provided to the network device via a network parameter configuration.

In some implementations, process 400 includes receiving, from the network device, reachability data identifying a reachability associated with the user equipment; and providing, to the application server, the reachability data identifying the reachability associated with the user equipment.

In some implementations, providing the reachability data identifying the reachability associated with the user equipment includes providing, to the application server, a user interface that includes the reachability data identifying the reachability associated with the user equipment, wherein the reachability data includes data identifying one or more of a current reachability status of the user equipment, a last reachable date and time is associating with the user equipment, a last disconnect is dating and time associated with the user equipment, a last data transmission is dating and time associated with the user equipment, an active time duration is associating with the user equipment, or a PSM time duration is associating with the user equipment.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device of a network, data identifying:
        a radio access technology (RAT) type associated with a user equipment of the network,
        an extended discontinuous reception (eDRX) timer associated with the user equipment, and
        a power saving mode (PSM) timer associated with the user equipment;
    storing, by the device, the received data;
    providing, by the device, a notification that includes the received data identifying the RAT type, the eDRX timer, and the PSM timer,
        wherein the data identifying the RAT type, the eDRX timer, and the PSM timer is to cause an application server to control or troubleshoot the user equipment;
    receiving, by the device, updated data identifying:
        an updated eDRX timer associated with the user equipment, and
        an updated PSM timer associated with the user equipment;
    replacing, by the device, the data identifying the eDRX timer and the PSM timer with the updated data identifying the updated eDRX timer and the updated PSM timer; and
    providing, by the device and to the application server, another notification that includes the updated data identifying the updated eDRX timer and the updated PSM timer,
        wherein the updated data identifying the updated eDRX timer and the updated PSM timer is to cause the application server to update control or troubleshooting of the user equipment.

2. The method of claim 1, further comprising:
    providing a report information request to a network device,
    wherein receiving the data identifying the RAT type, the eDRX timer, and the PSM timer comprises:
        receiving the data identifying the RAT type, the eDRX timer, and the PSM timer via a report information answer received based on the report information request.

3. The method of claim 1, wherein receiving the data identifying the RAT type, the eDRX timer, and the PSM timer comprises:
    receiving the data identifying the RAT type, the eDRX timer, and the PSM timer via a connection management request from a network device.

4. The method of claim 1, further comprising:
    providing a report information request to a network device,
    wherein receiving the updated data identifying the updated eDRX timer and the updated PSM timer comprises:
        receiving the updated data identifying the updated eDRX timer and the updated PSM timer via a report information answer received based on the report information request.

5. The method of claim 1, wherein receiving the updated data identifying the updated eDRX timer and the updated PSM timer comprises:
    receiving the updated data identifying the updated eDRX timer and the updated PSM timer via a connection management request.

6. The method of claim 1, wherein the eDRX timer is associated with an active time or an idle cycle time of the user equipment and the PSM timer is associated with the active time or a tracking area update sleep time of the user equipment.

7. The method of claim 1, wherein the data identifying the RAT type, the eDRX timer, and the PSM timer comprises attribute value pairs (AVPs).

8. A device, comprising:
    one or more memories; and
    one or more processors, coupled to the one or more memories, configured to:
        receive, from a network device of a network, data identifying:
            an extended discontinuous reception (eDRX) timer associated with a user equipment of the network, and
            a power saving mode (PSM) timer associated with the user equipment;
        store the data identifying the eDRX timer and the PSM timer;
        provide, to an application server, a notification that includes the data identifying the eDRX timer and the PSM timer,
            wherein the data identifying the eDRX timer and the PSM timer is to cause the application server to control or troubleshoot the user equipment;
        determine updated data identifying:
            an updated eDRX timer associated with the user equipment, and
            an updated PSM timer associated with the user equipment;

replace the data identifying the eDRX timer and the PSM timer with the updated data identifying the updated eDRX timer and the updated PSM timer; and provide, to the application server, another notification that includes the updated data identifying the updated eDRX timer and the updated PSM timer,
wherein the updated data identifying the updated eDRX timer and the updated PSM timer is to cause the application server to update control or troubleshooting of the user equipment.

9. The device of claim 8, wherein the one or more processors are further configured to:
cause the updated data identifying the updated eDRX timer and the updated PSM timer to be provided to the network device via a network parameter configuration.

10. The device of claim 8, wherein the device includes a service capability exposure function and the network device includes a mobility management entity.

11. The device of claim 8, wherein the one or more processors are further configured to:
receive, from the network device, reachability data identifying a reachability associated with the user equipment; and
provide, to the application server, the reachability data identifying the reachability associated with the user equipment.

12. The device of claim 11, wherein the one or more processors, when providing the reachability data identifying the reachability associated with the user equipment, are configured to:
provide, to the application server, a user interface that includes the reachability data identifying the reachability associated with the user equipment,
wherein the reachability data includes data identifying one or more of:
a current reachability status of the user equipment,
a last reachable date and time associated with the user equipment,
a last disconnect date and time associated with the user equipment,
a last data transmission date and time associated with the user equipment,
an active time duration associated with the user equipment, or
a PSM time duration associated with the user equipment.

13. The device of claim 8, wherein the user equipment includes an Internet of Things device.

14. The device of claim 8, wherein the data identifying the RAT type, the eDRX timer, and the PSM timer comprises attribute value pairs (AVPs).

15. A non-transitory computer-readable medium storing instructions, the instructions comprising:
one or more instructions that, when executed by one or more processors of a device, cause the one or more processors to:
receive, from a network device of a network, data identifying:
a radio access technology (RAT) type associated with a user equipment of the network,
an extended discontinuous reception (eDRX) timer associated with the user equipment, and
a power saving mode (PSM) timer associated with the user equipment;
store the data identifying the RAT type, the eDRX timer, and the PSM timer;

provide, to an application server, a notification that includes the data identifying the RAT type, the eDRX timer, and the PSM timer,
wherein the data identifying the RAT type, the eDRX timer, and the PSM timer is to cause the application server to control or troubleshoot the user equipment;
receive, from the network device, reachability data identifying a reachability associated with the user equipment;
provide, to the application server, the reachability data identifying the reachability associated with the user equipment;
receive updated data identifying:
an updated eDRX timer associated with the user equipment, and
an updated PSM timer associated with the user equipment;
replace the data identifying the eDRX timer and the PSM timer with the updated data identifying the updated eDRX timer and the updated PSM timer; and
provide, to the application server, another notification that includes the updated data identifying the updated eDRX timer and the updated PSM timer,
wherein the updated data identifying the updated eDRX timer and the updated PSM timer is to cause the application server to update control or troubleshooting of the user equipment.

16. The non-transitory computer-readable medium of claim 15,
wherein the one or more instructions, that cause the one or more processors to receive the data identifying the RAT type, the eDRX timer, and the PSM timer, cause the one or more processors to:
receive the data identifying the RAT type, the eDRX timer, and the PSM timer via a report information answer received based on the report information request.

17. The non-transitory computer-readable medium of claim 15, wherein the one or more instructions, that cause the one or more processors to receive the data identifying the RAT type, the eDRX timer, and the PSM timer, cause the one or more processors to:
receive the data identifying the RAT type, the eDRX timer, and the PSM timer via a connection management request.

18. The non-transitory computer-readable medium of claim 15, wherein the eDRX timer is associated with an active time or an idle cycle time of the user equipment and the PSM timer is associated with the active time or a tracking area update sleep time of the user equipment.

19. The non-transitory computer-readable medium of claim 15, wherein the one or more instructions, when executed by the one or more processors, further cause the one or more processors to:
determine the updated data identifying:
the updated eDRX timer associated with the user equipment, and
the updated PSM timer associated with the user equipment; and
cause the updated data identifying the updated eDRX timer and the updated PSM timer to be provided to the network device via a network parameter configuration.

20. The non-transitory computer-readable medium of claim 15, wherein the data identifying the RAT type, the eDRX timer, and the PSM timer comprises attribute value pairs (AVPs).

\* \* \* \* \*